United States Patent
Funakoshi et al.

(10) Patent No.: US 6,747,700 B1
(45) Date of Patent: Jun. 8, 2004

(54) SOLID STATE IMAGE PICKUP APPARATUS HAVING A PLURALITY OF SPLIT BUSES

(75) Inventors: Jun Funakoshi, Kanagawa (JP); Chikara Tsuchiya, Kanagawa (JP)

(73) Assignee: Fujitsu Limited, Kawaski (JP)

( * ) Notice: Subject to any disclaimer, the term of this patent is extended or adjusted under 35 U.S.C. 154(b) by 0 days.

(21) Appl. No.: 09/534,231

(22) Filed: Mar. 24, 2000

(30) Foreign Application Priority Data

Jun. 10, 1999 (JP) .......................................... 11-164415

(51) Int. Cl.[7] .............................................. H04N 5/335
(52) U.S. Cl. ...................................................... 348/308
(58) Field of Search ................................ 348/294, 302, 348/303, 304, 308; 250/208.1, 208.4

(56) References Cited

U.S. PATENT DOCUMENTS 5,818,526 A * 10/1998 Nomoto ...................... 348/302
6,118,115 A * 9/2000 Kozuka et al. ............ 250/208.1
6,486,911 B1 * 11/2002 Denyer et al. .............. 348/308

FOREIGN PATENT DOCUMENTS

JP    8-275068    10/1996

* cited by examiner

Primary Examiner—Tuan Ho
(74) Attorney, Agent, or Firm—Arent Fox, PLLC

(57) ABSTRACT

In a solid state image pickup apparatus, a read bus consists of, for instance, four lines of split buses and one line of integrated bus. This integrated bus can be connected to the four lines of split buses. Electrical connection between the integrated bus and each of the split buses is selected by a corresponding switching element. Thus, the number of switching elements connected to one split bus can be reduced and hence the capacitance of the split bus can be reduced. This allows pixel signals to be read out at a higher speed.

3 Claims, 4 Drawing Sheets

SOLID STATE IMAGE PICKUP APPARATUS HAVING A PLURALITY OF SPLIT BUSES

FIELD OF THE INVENTION

The present invention relates to a solid state image pickup apparatus. More particularly, this invention relates to a solid state image pickup apparatus with a MOS type of image pickup device.

BACKGROUND OF THE INVENTION

An image pickup tube or a solid state image pickup device has been used as a device for converting an optical image to an electric signal. The solid state image pickup device includes a CCD type of image pickup device with charge-coupled devices (CCD) and a MOS type of image pickup device with MOS transistors. The MOS type of image pickup device has an advantage that the cost of fabrication is lower than that of the CCD type of image pickup device because the MOS type of image pickup device can be fabricated using an ordinary fabrication process used for manufacturing a CMOS transistor.

The MOS type of image pickup device has another advantage that consumed current is about one tenth of the CCD type of image pickup device. Further, the solid state image pickup apparatus with a MOS type of image pickup device has an advantage that the solid state image pickup apparatus can be formed on a single chip if a circuit other than pixels (such as a circuit for reading pixel signals) is formed by MOS transistors because the pixels and the circuit other than the pixels can be fabricated on the same semiconductor substrate.

FIG. 1 is a schematic circuit diagram showing a configuration of a portion of the conventional type of solid state image pickup apparatus with a MOS type of image pickup device.

This solid state image pickup apparatus comprises pixels formed with sensors S00 to Smn and switching transistors Mr00 to Mrmn which are arranged in a matrix. Further, there are provided vertical selection lines V0 to Vm. Each of the vertical selection lines V0 to Vm is commonly connected to a group of pixels that belong to the same row. Further, there are provided horizontal selection lines H0 to Hn. Each of the horizontal selection lines H0 to Hn is commonly connected to a group of pixels that belong to the same column. Further, there are provided sample holding circuits SH0 to SHn to which the horizontal selection lines H0 to Hn are respectively connected.

The solid state image pickup apparatus further comprises a vertical scanning circuit 11 which sequentially selects the vertical selection lines V0 to Vm. Switching elements Mc0 to Mcn are provided for selecting the sample holding circuits SH0 to SHn. A horizontal scanning circuit 12 is provided which sequentially turns ON the switching elements Mc0 to Mcn. A read bus 13 which is a signal line common to the sample holding circuits SH0 to SHn is provided. An output amplifier 14 is connected to this read bus 13. In FIG. 1, reference numeral 15 represents an output terminal.

FIG. 2 is a circuit diagram that shows the circuit near the read bus in more detail. The sample holding circuits SH0 to SHn have driving transistors M0 to Mn. Each of the driving transistors M0 to Mn outputs a pixel signal read from the corresponding pixel.

The gate of each of the driving transistors M0 to Mn is supplied with a pixel signal and the drain is grounded. Thus, the transistors are used as a source followers. The switching elements Mc0 to Mcn consist of switching transistors. A selection signal is input from the horizontal scanning circuit 12 to the gates of each of there switching transistors.

Operation of the solid state image pickup apparatus shown in FIG. 1 and FIG. 2 is explained below. Each of the sensors S00 to Smn converts the incident light into an electric signal. The vertical scanning circuit 11 sequentially outputs the selection signals to the vertical selection lines V0 to Vm.

Accordingly, the switching transistors Mr00 to Mrmn are turned ON row by row. The signals detected by sensors S00 to Smn are stored in the sample holding circuits SH0 to SHn. The switching elements Mc0 to Mcn are then successively turned ON based on the selection signals output from the horizontal scanning circuit 12. These signals, namely the pixel signals stored in the sample holding circuits SH0 to SHn, are sequentially output to the read bus 13. The pixel signals output to the read bus 13 are amplified by the output amplifier 14 and are output from the output terminal 15.

In the conventional type of solid state image pickup apparatus, however, the same number of switching elements Mc0 to Mcn as that of the sample holding circuits SH0 to SHn are connected to the read bus 13. Accordingly, the capacitance of the read bus 13 becomes large due to the parasitic capacitance such as junction capacitance of transistors forming the switching elements Mc0 to Mcn. Therefore, there comes up a problem that it is difficult to increase the amount of pixel signals in order to provide a large number of pixels or to more speedily output pixel signals in order to increase the frame rate.

In order to read the pixel signals more speedily, a bias current of the read bus 13 may be increased by upsizing the driving transistors M0 to Mn for the sample holding circuits SH0 to SHn to enhance the driving capability of the current.

In order to increase the amount of current, however, the size of the transistors forming the switching elements Mc0 to Mcn has to be increased. This increases the parasitic capacitance, and as a result the capacitance of the read bus 13 increases further. Therefore, even if bias current to the read bus 13 is increased, it is difficult to achieve a sufficiently high speed.

SUMMARY OF THE INVENTION

It is an object of the present invention to provide a MOS type solid state image pickup apparatus which can read out the pixel signals at high speed.

The solid state image pickup apparatus according to one aspect of the present invention comprises, for instance, four read buses which read-out the pixel signals from a plurality of pixels, and one integrated bus which can be connected to the four split buses. The split buses are connected to the integrated bus through a switching element.

According to the above invention, since the read bus is split into a plurality of split buses, the number of switching elements to be connected to one split bus is reduced. Accordingly, the capacitance of the split bus is reduced and hence the pixel signals can be read at a higher speed.

Further, a constant-current source for the integrated bus provides a bias current to the integrated bus and a constant-current sources for the split buses provide a bias current to each of the split busses. However, the constant-current source for the integrated bus provides the bias current to the integrated bus which is greater in magnitude than the bias current provided to the split busses by the constant-current sources for the split buses. Accordingly, the degree of variations in the bias current passing through the read bus is decreased. Therefore, variations in the read signals due to different buses through which the signals pass can be suppressed to the level as low as possible.

Further, a bias-potential application circuit for the split buses maintains a potential of each of the split buses to substantially the same level regardless of the selection status of the split bus. Similarly, a bias-potential application circuit for the integrated bus maintains a potential of the integrated bus to substantially the same level as that of the split buses. Therefore, noise occurring when a switching element selects a split bus can be decreased.

Other objects and features of this invention will become apparent from the following description with reference to the accompanying drawings.

DESCRIPTION OF THE PREFERRED EMBODIMENTS

A preferred embodiment of the solid state image pickup apparatus according to the present invention is explained in detail below with reference to FIG. 3 and FIG. 4.

Figure 1:
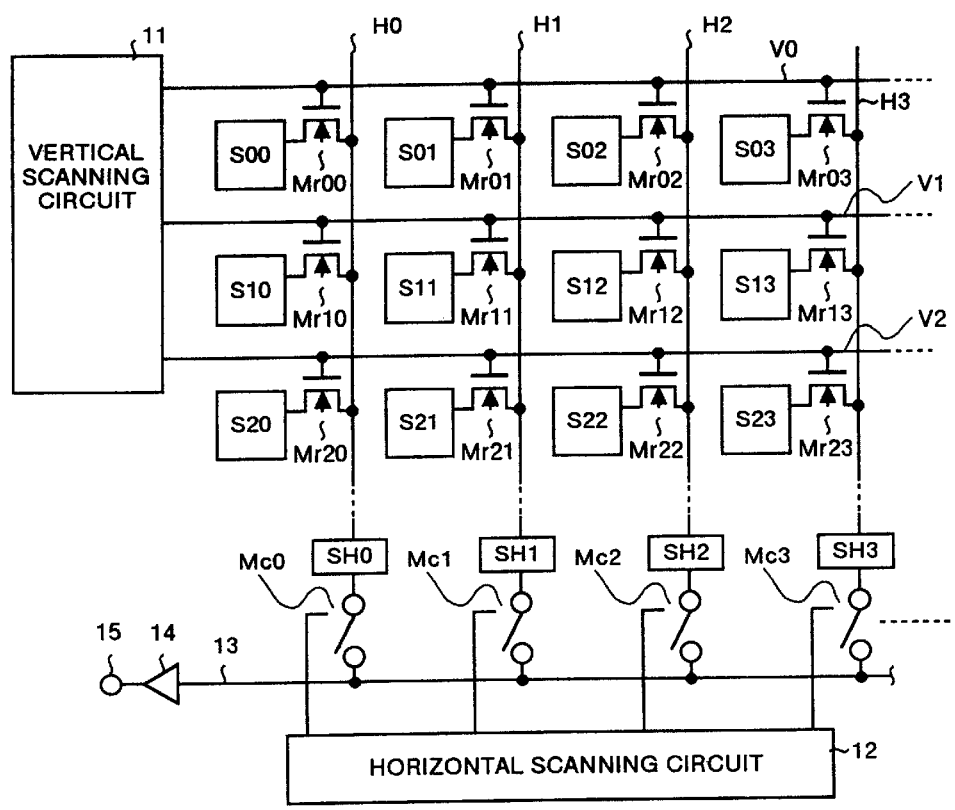
FIG. 1 is a schematic diagram showing circuit configuration of the conventional type of solid state image pickup apparatus with a MOS type of image pickup device.
Figure 2:
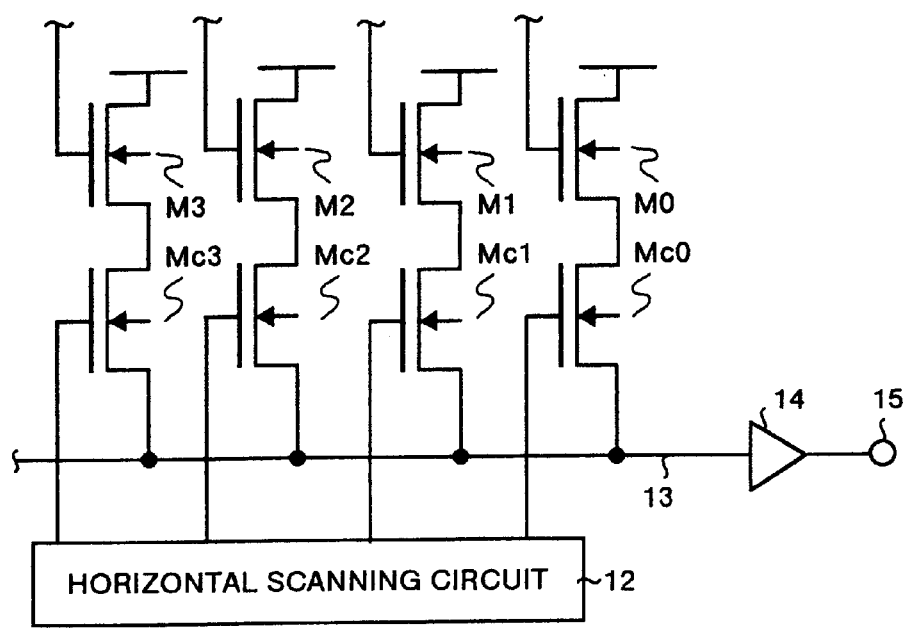
FIG. 2 is a circuit diagram showing the circuit near the read bus in the conventional type of solid state image pickup apparatus in more detail.
Figure 3:
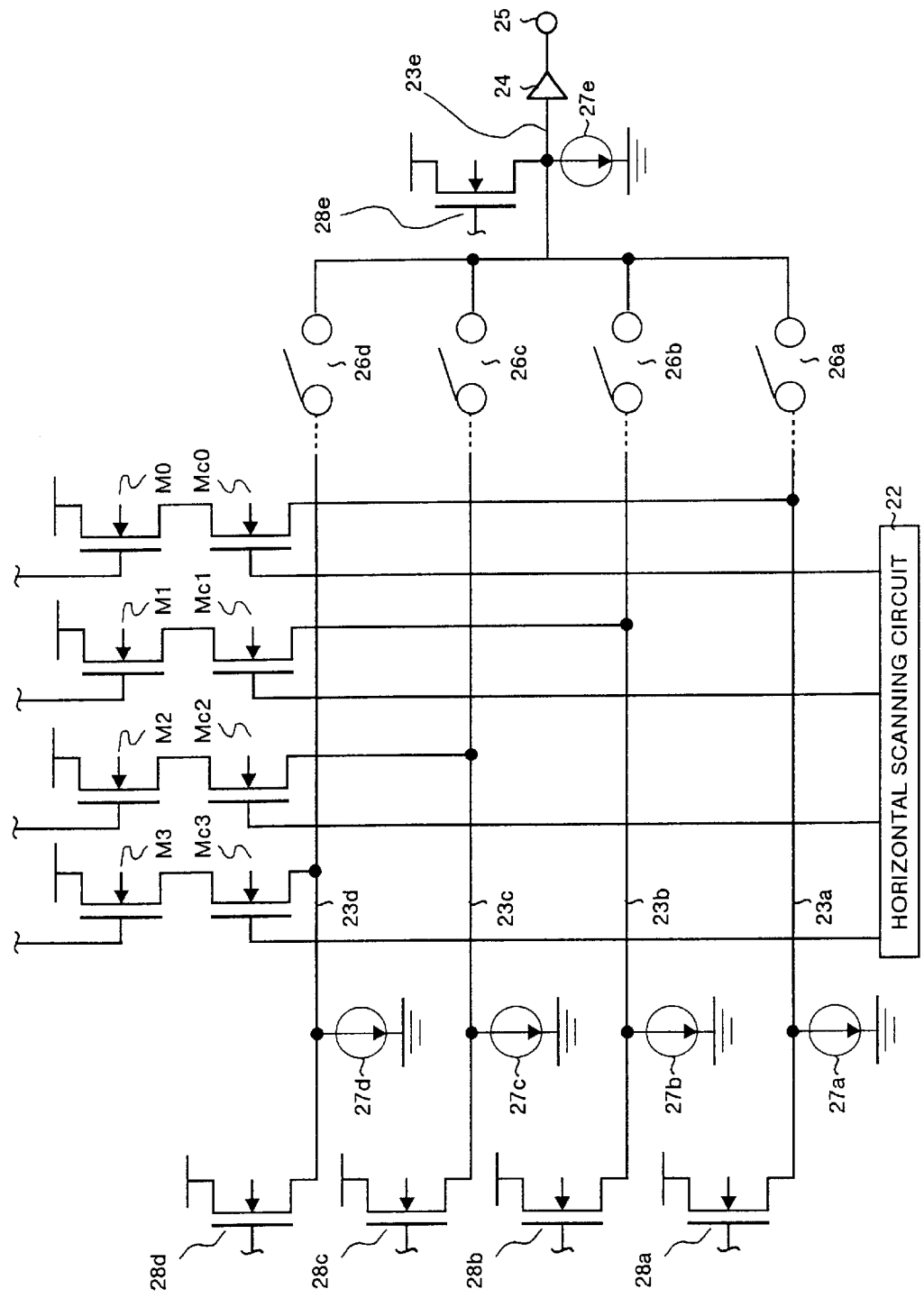
FIG. 3 is a circuit diagram showing the key section of one example of the solid state image pickup apparatus according to the present invention.

FIG. 3 is a circuit diagram showing the key section of one example of the solid state image pickup apparatus according to the present invention. Although the number of read buses each of which is used for sending pixel signals output from the driving transistors M0 to Mn for sample holding circuits to an output amplifier 24 is not particularly specified, the solid state image pickup apparatus comprises, for instance, four lines of split buses 23a, 23b, 23c, and 23d, and a line of integrated bus 23e which can be connected to those four lines of split buses 23a, 23b, 23c, and 23d.

A plurality of pixel columns which are not shown therein are split into one connected to the first split bus 23a, one connected to the second split bus 23b, one connected to the third split bus 23c, and one connected to the fourth split bus 23d.

In FIG. 3, reference numerals Mc0 to Mcn represent transistors forming switching elements, reference numeral 22 represent a horizontal scanning circuit, and reference numeral 25 represent an output terminal. The horizontal scanning circuit 22, the output amplifier 24, the structure of each pixel which is not shown, and the vertical scanning circuit are the same as those based on the conventional technology, therefore their explanation is omitted.

Referring specifically to the figure, for instance, output from the source of the first driving transistor M0 is provided to the first split bus 23a in response to turning ON of the transistor which forms the first switching element Mc0. Outputs from the sources of the second, third, and fourth driving transistors M1, M2, and M3 are provided to the second, third, and fourth split buses 23b, 23c, and 23d in response to turning ON of the transistors which form the second, third, and fourth switching elements Mc1, Mc2, and Mc3, respectively.

The split buses 23a, 23b, 23c, and 23d have the switching elements 26a, 26b, 26c, and 26d, respectively. The split buses 23a, 23b, 23c, and 23d are connected to the integrated bus 23e when the switching elements 26a, 26b, 26c, and 26d are turned ON.

The switching elements 26a, 26b, 26c, and 26d are ON-OFF controlled based on the control signals output from a control circuit which is not shown in the figure. When a pixel signal is to be read out, any one of the switching elements 26a, 26b, 26c, and 26d is turned ON. When a signal is not to be read out, all of the switching elements 26a, 26b, 26c, and 26d are put in the OFF state.

The split buses 23a, 23b, 23c, and 23d are connected to the constant-current sources 27a, 27b, 27c, and 27d, respectively. The integrated bus 23e is connected to the constant-current source 27e. Magnitude of the current passed by each of the constant-current sources 27a, 27b, 27c, 27d, and 27e is set so that greater bias current passes through the integrated bus 23e than through the split buses 23a, 23b, 23c, and 23d.

Assuming that the magnitude of bias current passing through the split buses 23a, 23b, 23c, and 23d is I, although it is not particularly specified, the magnitude of bias current passing through the integrated bus 23e is 9×I, namely nine times of the above mentioned magnitude.

Therefore, when bias current passing through each of the split buses 23a, 23b, 23c, and 23d varies by, for instance, plus or minus 10% due to variations in output from the constant-current sources 27a, 27b, 27c, and 27d, the bias current passing through each of the split buses 23a, 23b, 23c, and 23d is within a range from 0.9×I to 1.1×I. Whereas the bias current passing through the integrated bus 23e is 9×I, therefore even when any of the split buses 23a, 23b, 23c, and 23d is selected, the bias current passing through the read bus at that time is within a range from 9.9×I to 10.1×I.

Namely, even when any of the split buses 23a, 23b, 23c, and 23d is selected, variation in bias current passing through the read bus to which the selected one of the split buses 23a, 23b, 23c, 23d and the integrated bus 23e are connected is within plus or minus 1%.

The split buses 23a, 23b, 23c, and 23d are connected to bias-potential application circuits 28a, 28b, 28c, and 28d, respectively. The integrated bus 23e is connected to a bias-potential application circuit 28e. Each of these bias-potential application circuits 28a, 28b, 28c, 28d, and 28e consists of a transistor in the same manner as the driving transistors M0 to Mn for the sample holding circuits.

Therefore, the potential in the split buses 23a, 23b, 23c, and 23d can be maintained, by the bias-potential application circuits 28a, 28b, 28c, and 28d even when the circuits are not selected, to a somewhat lower level as that by the source followers of the driving transistors M0 to Mn. Further, the potential in the split buses 23a, 23b, 23c, and 23d can be maintained to a somewhat lower level as that of the integrated bus 23e.

Operation of the solid state image pickup apparatus shown in FIG. 3 is explained below. The sensor of each of the pixels, which is not shown in this figure, converts an incident light into an electric signal. The switching transistors corresponding to the pixels are successively turned ON row by row by the vertical scanning circuit not shown. The signal detected by the sensor is stored in the sample holding circuit.

The switching elements Mc0 to Mcn are then sequentially turned ON based on selection signals output from the horizontal scanning circuit 22. The pixel signals stored in the sample holding circuits are successively output to the split buses 23a, 23b, 23c, and 23d. At the same time, the switching elements 26a, 26b, 26c, and 26d are sequentially turned ON based on the control signals output from the control circuit not shown. Accordingly, the pixel signals output to the split buses 23a, 23b, 23c, and 23d successively reach the output amplifier 24 via the integrated bus 23e. The signals are amplified in the amplifier 24 and output from the output terminal 25.

According to this embodiment, since the read bus is split into a plurality of split buses 23a, 23b, 23c, and 23d, the number of switching elements Mc0 to Mcn connected to each of the split buses 23a, 23b, 23c, and 23d can be decreased by, for instance, a factor of four. Therefore the capacitance of each of the split buses 23a, 23b, 23c, and 23d decreases, which allows pixel signals to be read out at a higher speed.

Further, according to this embodiment, variations in the bias current passing through the read bus can be made smaller due to the provision of the constant-current sources 27a, 27b, 27c, 27d, and 27e. Thus, variations in the read signals due to different buses through which the signals pass can be suppressed to a value as small as possible.

Further, noise occurring due to turning ON/OFF of the switching elements Mc0 to Mcn as well as of the switching elements 26a, 26b, 26c, and 26d can be decreased due to the provision of the bias-potential application circuits 28a, 28b, 28c, 28d, and 28e. At the same time, when any one of the split buses 23a, 23b, 23c, and 23d is selected, it is not required to charged up the selected bus. This allows pixel signals to be read out at a higher speed.

Figure 4:
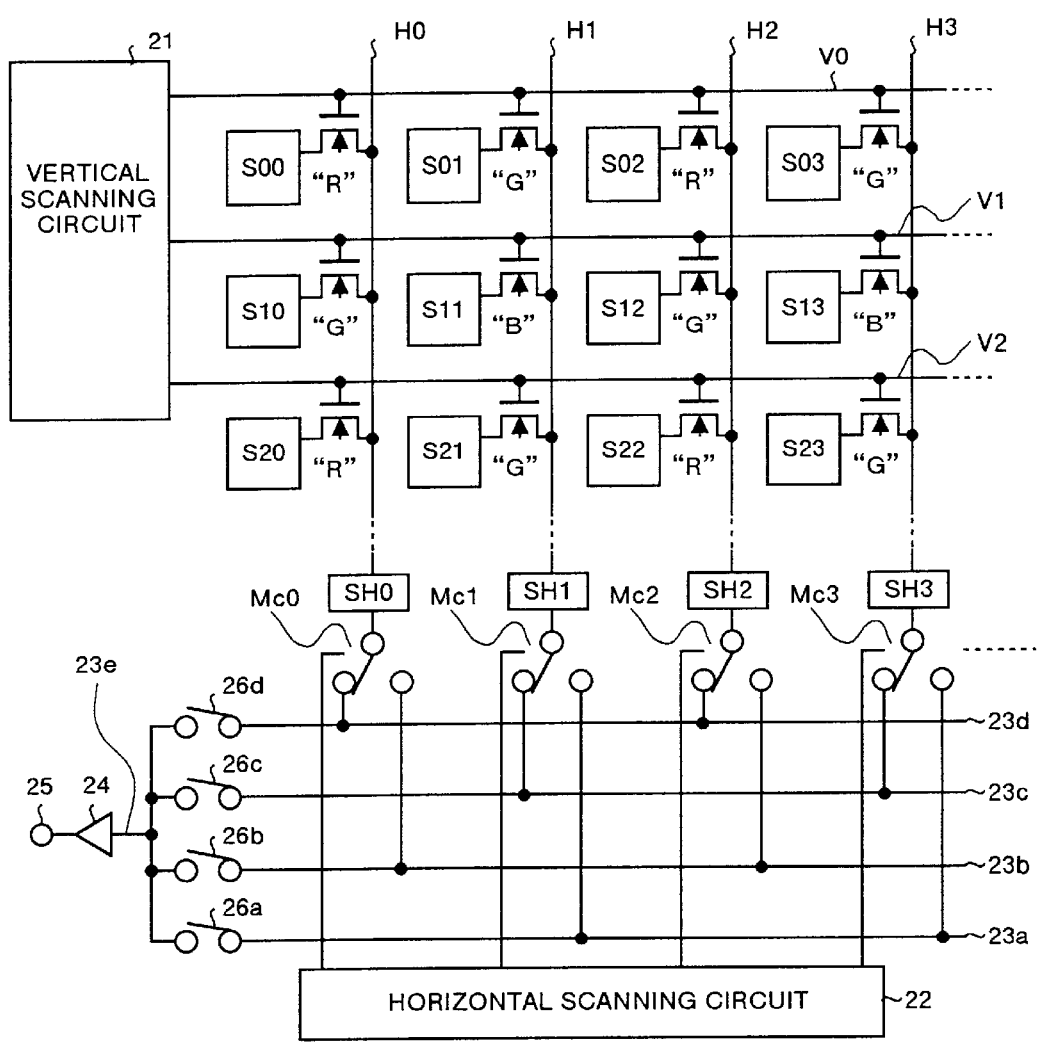
FIG. 4 is a schematic diagram showing a circuit configuration in the case where the solid state image pickup apparatus according to the present invention can represent colors.

FIG. 4 is a schematic diagram showing a circuit configuration in the case where the solid state image pickup apparatus according to the present invention can represent colors. A case in which mosaic-shaped color filters for RGB primary colors are used is explained. In FIG. 4, "R" represents a pixel of red color, "G" represents a pixel of green color, and "B" represents a pixel of blue color.

In FIG. 4, the signal of the pixels of "R" and "G" connected to the first and third horizontal selection lines H0 and H2, namely pixels corresponding to the sensors S00, S10, S20, S02, S12, and S22, can be output to either of the second and fourth split buses 23b and 23d via the sample holding circuit SH0 or SH2. The signal of the pixels of "G" and "B" connected to the second and fourth horizontal selection lines H1 and H3, namely pixels corresponding to the sensors S01, S11, S21, S03, S13, and S23, can be output to either of the first and third split buses 23a and 23c via the sample holding circuit SH1 or SH3. Switching between the second split bus 23b and fourth split bus 23d and switching between the first split bus 23a and third split bus 23c is performed based on a selection signal output from the horizontal scanning circuit 22.

Thus, allocation of the split buses 23a, 23b, 23c, and 23d to different colors eliminates concern for variations in gains due to a signal passing through each of the split buses.

The present invention described above is not limited only to the above mentioned embodiment but also variants of the present invention may be possible. For example, pixels may be arranged one dimensionally or two dimensionally. In addition, the number of the split buses 23a, 23b, 23c, and 23d is not limited to four lines but may be two or three lines, or even five or more lines.

According to the present invention, the read bus is split into a plurality of split buses. Therefore, the number of switching elements to be connected to one split bus can be reduced and hence the capacitance of each split bus can be decreased. Thus, it is possible to obtain a MOS type of solid state image pickup apparatus which can read pixel signals at a high speed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A solid state image pickup apparatus comprising:
   a plurality of pixels which are arranged in at least one rows and grouped into a plurality of groups;
   a horizontal scanning circuit which reads a pixel signal from said pixels;
   a plurality of horizontal selection lines, each of the horizontal selection lines connected to the pixel in each of the rows for outputting the pixel signal;
   a plurality of split buses selectively connected to each of the horizontal selection lines;
   a plurality of selecting switches, each of the selecting switches connected to each of the horizontal selection lines for selecting one of the split buses based on a selection signal output from the horizontal scanning circuit for outputting the pixel signal to selected one of the split buses;
   an integrated bus selectively connected to each of said split buses; and
   switching elements connected between the split buses and the integrated bus for validating the electrical connection between each of said split buses and said integrated bus only to any one of the split buses, or for invalidating the connection to all of the split buses.

2. The solid state image Pickup apparatus according to claim 1 further comprising:
   a current source for the integrated bus, which passes a bias current through said integrated bus; and
   current sources for the split buses, each of which passes a bias current through said integrated bus; and
   current sources for the split buses, each of which passes a bias current that is smaller than the bias current passing through said integrated bus through each of said split buses.

3. The solid state image pickup apparatus according to claim 1 further comprising:
   circuits for the split buses, each of which circuits applies a bias potential to respective split buses; and
   a circuit for the integrated bus, each of which circuits applies a bias potential to said integrated bus.

* * * * *

UNITED STATES PATENT AND TRADEMARK OFFICE
CERTIFICATE OF CORRECTION

PATENT NO. : 6,747,700 B1
APPLICATION NO. : 09/534231
DATED : June 8, 2004
INVENTOR(S) : Jun Funakoshi et al.

It is certified that error appears in the above-identified patent and that said Letters Patent is hereby corrected as shown below:

Column 6,
Lines 49-50, delete "current sources for the split buses, each of which passes a bias current through said integrated bus; and".

Signed and Sealed this

Twentieth Day of June, 2006

JON W. DUDAS
*Director of the United States Patent and Trademark Office*